US009912532B2

(12) United States Patent
Astigarraga et al.

(10) Patent No.: US 9,912,532 B2
(45) Date of Patent: Mar. 6, 2018

(54) PORT GROUP CONFIGURATION FOR INTERCONNECTED COMMUNICATION DEVICES

(71) Applicant: INTERNATIONAL BUSINESS MACHINES CORPORATION, Armonk, NY (US)

(72) Inventors: Tara Astigarraga, Fairport, NY (US); Jose R. Mosqueda Mejia, Puruandiro (MX); Laura M. Reid, Tucson, AZ (US); Scott R. Ratzloff, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 198 days.

(21) Appl. No.: 14/613,604

(22) Filed: Feb. 4, 2015

(65) Prior Publication Data
US 2016/0226704 A1     Aug. 4, 2016

(51) Int. Cl.
*H04L 12/24* (2006.01)
*H04L 12/26* (2006.01)

(52) U.S. Cl.
CPC .......... *H04L 41/0803* (2013.01); *H04L 43/12* (2013.01)

(58) Field of Classification Search
CPC ................................................ H04L 41/0803
See application file for complete search history.

(56) References Cited

U.S. PATENT DOCUMENTS

| 5,699,388 | A | * | 12/1997 | Wang | ..................... | H04B 7/269 370/507 |
| 7,542,572 | B2 | | 6/2009 | Meier et al. | | |
| 7,898,986 | B2 | * | 3/2011 | Ford | ................... | H04L 41/0806 370/255 |
| 8,639,783 | B1 | * | 1/2014 | Bakke | ..................... | H04L 49/70 709/220 |
| 8,923,277 | B1 | * | 12/2014 | Shekhar | ................... | H04L 49/10 370/352 |
| 9,432,254 | B1 | * | 8/2016 | Naqvi | ................. | H04L 12/2409 |
| 2002/0097687 | A1 | * | 7/2002 | Meiri | ..................... | G06F 11/20 370/254 |

(Continued)

OTHER PUBLICATIONS

Campbell et al., "Open Network Administrator (ONA)—A Web-based Network Management Tool" pp. 89-101, In Lisa, 2005.

*Primary Examiner* — Backhean Tiv
(74) *Attorney, Agent, or Firm* — Griffiths & Seaton PLLC

(57) ABSTRACT

Methods, computer systems, and computer program products for configuring ports of interconnected communications equipment include, defining configuration parameters for at least one port of a plurality of ports of a plurality of interconnected communications devices; defining a group of the at least one port of the plurality of ports of the plurality of interconnected communications devices into a configuration group; and creating an explicit link mirroring the defined configuration parameters of the at least one port of the plurality of ports of the plurality of interconnected communications devices to the defined configuration group of at least one port of the plurality of ports of the plurality of interconnected communications devices, such that changes made to the defined configuration parameters are replicated and synced to the defined configuration group.

24 Claims, 3 Drawing Sheets

(56) References Cited

U.S. PATENT DOCUMENTS

| | | | |
|---|---|---|---|
| 2005/0010691 A1* | 1/2005 | Oyadomari | H04B 7/26 709/248 |
| 2006/0268686 A1* | 11/2006 | Shei | H04L 49/552 370/217 |
| 2007/0064624 A1* | 3/2007 | Finn | H04L 12/4625 370/254 |
| 2007/0189288 A1* | 8/2007 | Andrews | H04L 12/66 370/390 |
| 2007/0198665 A1* | 8/2007 | De Matteis | H04L 41/0843 709/220 |
| 2008/0244172 A1* | 10/2008 | Kano | G06F 11/2069 711/112 |
| 2009/0080425 A1* | 3/2009 | Parker | H04L 12/4645 370/390 |
| 2009/0100275 A1* | 4/2009 | Chang | G06F 1/266 713/300 |
| 2010/0290473 A1 | 11/2010 | Enduri et al. | |
| 2011/0283278 A1* | 11/2011 | Murrell | G06F 9/5077 718/1 |
| 2011/0286357 A1* | 11/2011 | Haris | H04L 12/462 370/254 |
| 2013/0074066 A1* | 3/2013 | Sanzgiri | H04L 49/70 718/1 |
| 2013/0100809 A1* | 4/2013 | Gale | H04L 41/082 370/235 |
| 2013/0125112 A1* | 5/2013 | Mittal | H04L 41/0813 718/1 |
| 2013/0148511 A1* | 6/2013 | Banga | H04L 41/082 370/250 |
| 2014/0059225 A1* | 2/2014 | Gasparakis | H04L 29/0818 709/226 |
| 2014/0115576 A1 | 4/2014 | Kothari et al. | |
| 2014/0226523 A1* | 8/2014 | Deshpande | H04L 49/70 370/254 |
| 2015/0003442 A1* | 1/2015 | Sun | H04W 16/02 370/350 |
| 2015/0106518 A1* | 4/2015 | Amann | G06F 9/45558 709/225 |
| 2015/0271106 A1* | 9/2015 | Walker | H04L 49/30 370/419 |
| 2016/0191314 A1* | 6/2016 | Russell | H04L 41/22 709/221 |
| 2016/0226704 A1* | 8/2016 | Astigarraga | H04L 41/0803 |

* cited by examiner

PORT GROUP CONFIGURATION FOR INTERCONNECTED COMMUNICATION DEVICES

BACKGROUND OF THE INVENTION

Field of the Invention

The present invention relates in general to computing systems, and more particularly, to various embodiments for configuring ports of interconnected communications equipment.

Description of the Related Art

Today with modern technology, large volumes of data are storable on disk drives; these drives can exist as a solo entity, or as part of a broader make up within a larger storage environment, for example as part of a Storage Area Network (SAN). As the sheer volume of data in today's information-based society continues to increase, so too does the demands placed on communications and data processing infrastructures that serve to manipulate, transfer, and otherwise handle this data.

SUMMARY OF THE DESCRIBED EMBODIMENTS

Complex SAN configurations enable large numbers of computing components such as servers to access common storage via interconnection switches and cabling. The availability, integrity and recovery of these interconnections are critical to the reliable operations of the systems. Virtual storage area networks (VSANs), modeled after virtual local area networks (VLANs) are often used because of their flexibility in set up.

Networking equipment, such as SAN switches and Network switches must be set up and configured by an administrator. One aspect that administrators must maintain is the port configuration parameters on such equipment, used to define policy within the connected cabling for interconnecting systems. Often times, the same values are used to configure dozens, if not hundreds of ports on any number of switches within an environment. Currently, there exists no technique, however, to implement the same port configuration parameters over a group of given ports within the environment, in such a way that the configuration parameters of a defined port are mirrored across the group.

Accordingly, various methods, systems, and computer program product embodiments for configuring ports of interconnected communications devices, by a processor device, are provided. In one embodiment, by way of example only, the method comprises, defining configuration parameters for at least one port of a plurality of ports of a plurality of interconnected communications devices; defining a group of the at least one port of the plurality of ports of the plurality of interconnected communications devices into a configuration group; and creating an explicit link mirroring the defined configuration parameters of the at least one port of the plurality of ports of the plurality of interconnected communications devices to the defined configuration group of at least one port of the plurality of ports of the plurality of interconnected communications devices, wherein changes made to the defined configuration parameters of the at least one port of the plurality of ports of the plurality of interconnected communications devices are replicated and synced to the defined configuration group of at least one port of the plurality of ports of the plurality of interconnected communications devices.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, complex SAN configurations enable large numbers of computing components such as servers to access common storage via interconnection switches and cabling. The availability, integrity and recovery of these interconnections are critical to the reliable operations of the systems. Virtual storage area networks (VSANs), modeled after virtual local area networks (VLANs) are often used because of their flexibility in set up.

Networking equipment, such as SAN switches and Network switches must be set up and configured by an administrator. One aspect that administrators must maintain is the port configuration parameters on such equipment, used to define policy within the connected cabling for interconnecting systems. Often times, the same values are used to configure dozens, if not hundreds of ports on any number of switches within an environment. Currently, there exists no technique, however, to implement the same port configuration parameters over a group of given ports within the environment, in such a way that the configuration parameters of a defined port are mirrored across the group.

One example applies to ports in static trunks, which need the same link configuration (i.e. speed, duplex, flow control) across each port. Networking devices often do include the functionality to create ranges of ports (i.e. Eth ½-8), however lack the logic to classify port members into a group and automatically apply changes made to one port across a given defined port subset.

In view of the foregoing, the mechanisms of the illustrated embodiments provide various solutions to the previous challenges configuring ports of interconnected communications equipment. These mechanisms include using a processor device to execute such functionality as defining configuration parameters for at least one port of a plurality of ports of a plurality of interconnected communications devices (i.e. SAN switches), defining a group of the at least one port into a configuration group, and creating an explicit link mirroring the defined configuration parameters of the at least one port of the defined configuration to the at least one port of the configuration group, such that changes made to the defined configuration parameters of the at least one port are replicated and synced to the defined configuration group of at least one port, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios.

Figure 1:
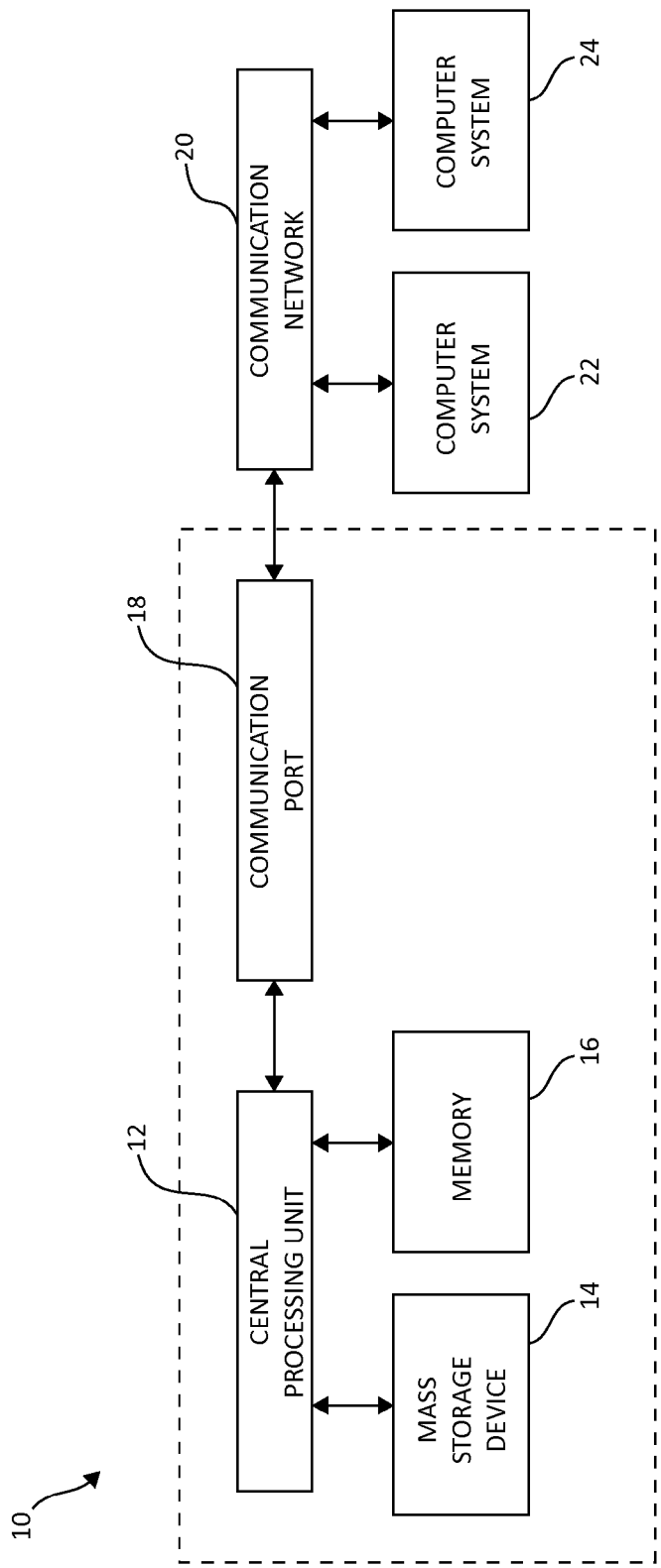
FIG. 1 illustrates a block diagram of an exemplary hardware structure for effecting management of multipath I/O, in which aspects of the present invention may be realized.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD), flash memory, USB, CD-RW, etc., which may be configured in a redundant array of independent disks (RAID). The communication port 18, communication network 20, and other components not pictured for the sake of brevity but known to the skilled artisan may include such hardware components as fibre channel cabling, fibre channel ports, Host-Bus Adapters (HBAs), Converged Network Adapters (CNAs), network switches and switching components, and similar communications mechanisms known to one of ordinary skill in the art. Various aspects of the illustrated embodiments may be realized using one or more of these components as will be further described.

The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
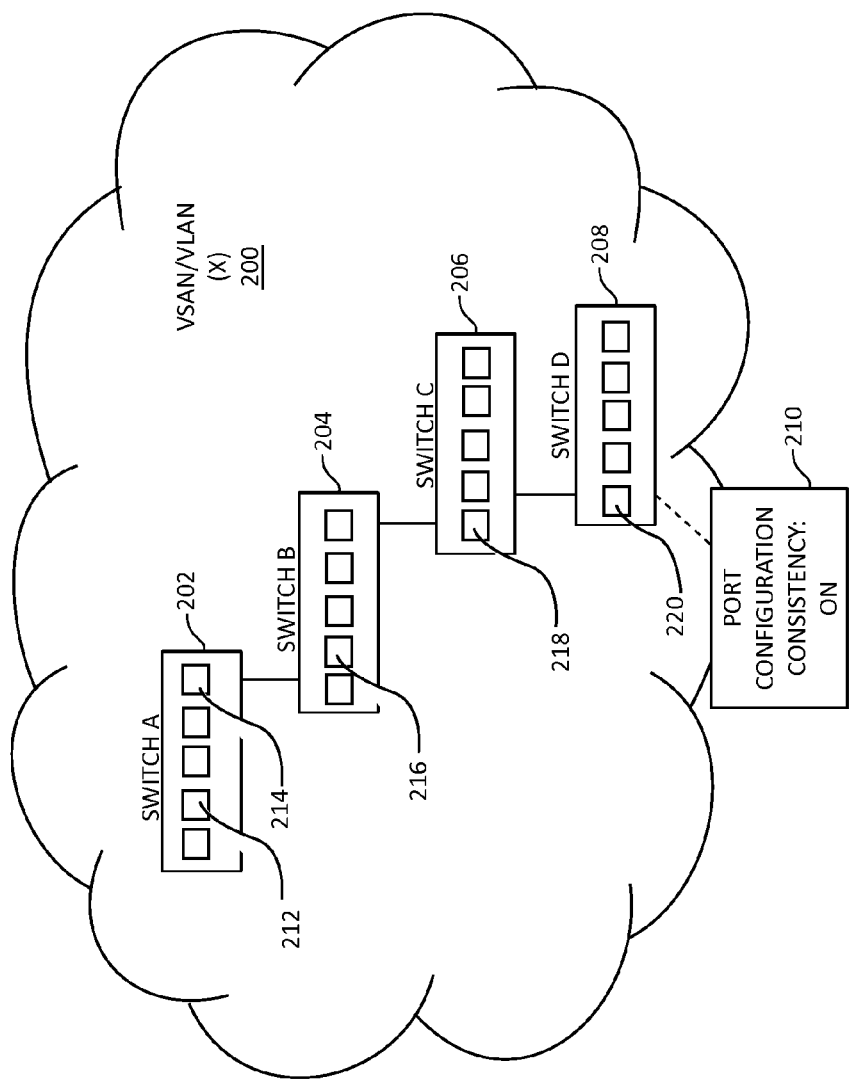
FIG. 2 illustrates an additional block diagram of an additional exemplary hardware structure, specifically portions of a complex SAN, again in which aspects of the present invention may be realized.

FIG. 2 illustrates a block diagram of a hardware structure, specifically portions of a complex SAN environment, in which the present invention may be implemented. Interconnected switches, switch A 202, switch B 204, switch C 206, and switch D 208 are shown. Each device has a plurality of ports to connect cabling for interconnecting systems.

Consider the following example. Of the ports on each device, port 212 and port 214 on switch A 202, port 216 on switch B 204, port 218 on switch C 206, and port 220 on switch D 208 are configured to make up VSAN (X) 200. Under current methodologies, if an administrator wanted to change the configuration parameters of ports 212, 214, 216, 218, and 220, which comprise VSAN (X) 200, it would be required separately, even if the administrator were applying the same configuration values to each port in the environment. Considering that in an actual implementation there may be many dozens to hundreds of ports in a given environment, the task becomes impractical.

The present invention considers a method to automate and optimize this process. The method allows for a specified defined subset of ports to be classified into a group wherein changes made to the configuration parameters of one port within the group are reflected and propagated across each port specified within the group. In other words, an explicit link is created between the port configurations of the group such that changes made to the configuration of one or more of the ports within the defined group are automatically applied across all other group members. This functionality may be enabled or disabled by an administrator within a user interface, such as the set up configuration menu of a given switch, for example.

Re-examining FIG. 2 under an implementation of the present invention, a port configuration consistency feature 210 is enabled within the configuration menus of each switch desired within the environment (i.e. VSAN configuration menu). With the port configuration consistency feature 210 operative, changes made to port 212, for example, will now propagate and reflect on port 214, port 216, port 218, and port 220 automatically.

The consistency functionality may be implemented in one embodiment such that only parameter changes made on a predefined port reflect across the environment. In another embodiment, parameter changes on any port within the configuration group may be applied to the environment. Ports may be assigned individually, or a range of ports may be assigned to allocate the feature. Additionally, the port configuration consistency feature 210 may be set up to exclude certain ports or specific port parameters depending on the implementation. Attributes, such as port characteristics, grouping type, port setup, network ranges, and consistency, are examples of parameters that may also be defined in one or more switch port profiles. A switch port profile may be created to sort or filter ports to be added to a configuration group. In one embodiment, the defined configuration group may be all ports within a network group. Alternatively, in another embodiment, it may be all ports within a network group as defined by an administrator.

Consider another example. A blade switch has been configured with two separate VLANs, VLAN A and VLAN B. Within the switch device, even port numbers are affiliated with VLAN A and odd port numbers are affiliated with VLAN B. The port configuration consistency feature 210 has been enabled for VLAN A. With the feature enabled, each time a port within VLAN A, or the even port numbers of the device, experiences a configuration change, each of the other ports within VLAN A will be mirrored and synched to reflect the same configuration values. The ports that comprise VLAN B, or the odd numbered ports, even though physically on the same hardware device, will be unaffected. This example may also have been accomplished using a switch port profile enabled to include to the configuration group the network range of even port numbers. If VLAN A did not consist of all even port numbers on the device, however, the even port switch port profile and VLAN A configuration group would consist of a different member group and as such, an administrator may choose one or the other depending on the goals of the specific implementation.

Figure 3:
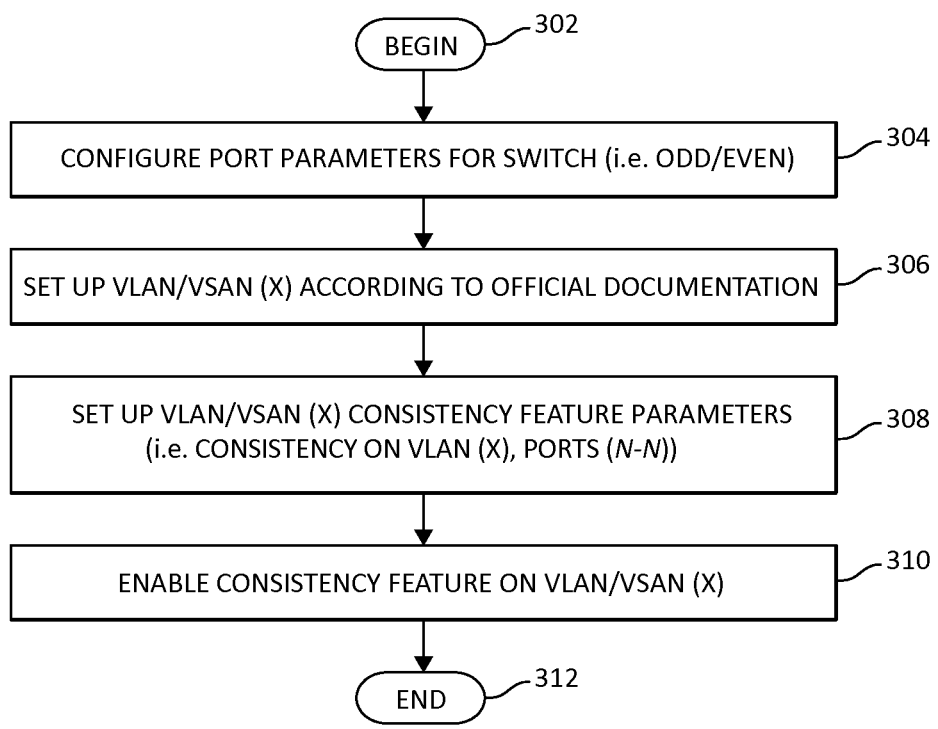
FIG. 3 illustrates a flow chart according to one aspect of the present invention.

Turning now to FIG. 3, a flow chart representing steps for one implementation of one embodiment of the present invention is illustrated. Beginning at 302, an administrator begins by configuring port parameters for a switch 304 (i.e. odd/even port numbers). Using the official documentation for the particular device, a VLAN or VSAN, for example, is then set up 306. Parameters are then defined for the consistency configuration (i.e. consistency on VLAN (x), ports (n-n)) 308. The consistency feature is then enabled for the set parameters 310, and the process ends 312.

Significantly, the present invention does not require additional hardware components to operate; the aforementioned functionality may be applied to new and existing equipment alike. Additionally, the aforementioned functionality may be enabled by an administrator, such as in the examples above, or alternately may be enabled by default as an original configuration application that operates standardly without the need for set up.

It should be noted that the above-described process has been placed in numerical order for convenience. In an actual implementation of the present invention, it should be appreciated that depending on the specific goals of the developer, the described process may function within the layers of the OSI method 100 in any such order. Additionally, each layer may be monitored separately, or the monitoring may be homogeneous and occurring continually. Furthermore, it should be appreciated that depending upon the specific situation, not all layers must be present to function appropriately, as one of ordinary skill in the art would widely recognize.

Although the present invention has been described above on the basis of the embodiment, the technical scope of the present invention is not limited to the above embodiment. It is apparent to those skilled in the art that various modifications or improvements can be added to the above embodiment.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any orders unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for configuring ports of interconnected communications equipment by a processor device, the method comprising:
    defining configuration parameters for at least one port of a plurality of ports of a plurality of interconnected communications devices, wherein defining the configuration parameters further includes defining at least one switch port profile, including a grouping type, a port setup characteristic, a network range, a consistency comprising port parameters to exclude from the at least one switch port profile, and a link configuration comprising at least a speed, a duplex, and a flow control;
    defining a group of the at least one port of the plurality of ports of the plurality of interconnected communications devices into a configuration group; and
    creating an explicit link mirroring the defined configuration parameters of the at least one port of the plurality of ports of the plurality of interconnected communications devices to the defined configuration group of at least one port of the plurality of ports of the plurality of interconnected communications devices,
        wherein changes made subsequent to defining the defined configuration parameters of the at least one port of the plurality of ports of the plurality of interconnected communications devices are replicated and synced to the defined configuration group of at least one port of the plurality of ports of the plurality of interconnected communications devices.

2. The method of claim 1, wherein the interconnected communications devices are network switches.

3. The method of claim 1, wherein defining a group further includes defining a group of at least one port of the plurality of ports of the plurality of interconnected communications devices into the configuration group via a user interface.

4. The method of claim 1, further comprising disabling the defined configuration parameters on at least one port of the plurality of ports of the plurality of interconnected communications devices in the configuration group.

5. The method of claim 1, wherein said method is automated, and selected as a default configuration.

6. The method of claim 1, wherein said method is manually performed by an administrator.

7. The method of claim 1, wherein defining a group further includes all ports within the configuration group.

8. The method of claim 7, wherein defining a group further includes all ports within the configuration group as defined by the administrator.

9. A system for configuring ports of interconnected communications equipment, comprising:
    a processor device, wherein the processor device:
        defines configuration parameters for at least one port of a plurality of ports of a plurality of interconnected communications devices, wherein defining the configuration parameters further includes defining at least one switch port profile, including a grouping type, a port setup characteristic, a network range, a consistency comprising port parameters to exclude from the at least one switch port profile, and a link configuration comprising at least a speed, a duplex, and a flow control;
        defines a group of the at least one port of the plurality of ports of the plurality of interconnected communications devices into a configuration group; and
        creates an explicit link that mirrors the defined configuration parameters of the at least one port of the plurality of ports of the plurality of interconnected communications devices to the defined configuration group of at least one port of the plurality of ports of the plurality of interconnected communications devices,
            wherein changes made subsequent to defining the defined configuration parameters of the at least one port of the plurality of ports of the plurality of interconnected communications devices are replicated and synced to the defined configuration group of at least one port of the plurality of ports of the plurality of interconnected communications devices.

10. The system of claim 9, wherein the interconnected communications devices are network switches.

11. The system of claim 9, wherein the processor device defines a group of at least one port of the plurality of ports of the plurality of interconnected communications devices into a configuration group via a user interface.

12. The system of claim 9, wherein the processor device disables the defined configuration parameters on at least one port of the plurality of ports of the plurality of interconnected communications devices in the configuration group.

13. The system of claim 9, wherein said system is automated, and selected as a default configuration.

14. The system of claim 9, wherein said system is manually performed by an administrator.

15. The system of claim 9, wherein the processor device defines a group further includes all ports within the configuration group.

16. The system of claim 15, wherein the processor device defines a group further includes all ports within the configuration group as defined by the administrator.

17. A computer program product for configuring ports of interconnected communications devices, the computer program product comprising a non-transitory computer-readable storage medium having computer-readable program code portions stored therein, the computer-readable program code portions comprising:

a first executable portion that:
defines configuration parameters for at least one port of a plurality of ports of a plurality of interconnected communications devices, wherein defining the configuration parameters further includes defining at least one switch port profile, including a grouping type, a port setup characteristic, a network range, a consistency comprising port parameters to exclude from the at least one switch port profile, and a link configuration comprising at least a speed, a duplex, and a flow control;
defines a group of the at least one port of the plurality of ports of the plurality of interconnected communications devices into a configuration group; and
creates an explicit link that mirrors the defined configuration parameters of the at least one port of the plurality of ports of the plurality of interconnected communications devices to the defined configuration group of at least one port of the plurality of ports of the plurality of interconnected communications devices,
wherein changes made subsequent to defining the defined configuration parameters of the at least one port of the plurality of ports of the plurality of interconnected communications devices are replicated and synced to the defined configuration group of at least one port of the plurality of ports of the plurality of interconnected communications devices.

18. The computer program product of claim 17, wherein the interconnected communications devices are network switches.

19. The computer program product of claim 17, further including a second executable portion that defines a group of at least one port of the plurality of ports of the plurality of interconnected communications devices into a configuration group via a user interface.

20. The computer program product of claim 17, further including a second executable portion that disables the defined configuration parameters on at least one port of the plurality of ports of the plurality of interconnected communications devices in the configuration group.

21. The computer program product of claim 17, wherein said computer program product is automated, and selected as a default configuration.

22. The computer program product of claim 17, wherein said computer program product is manually performed by an administrator.

23. The computer program product of claim 17, wherein the computer program product defines a group further includes all ports within the configuration group.

24. The computer program product of claim 23, wherein the computer program product defines a group further includes all ports within the configuration group as defined by the administrator.

* * * * *